United States Patent
Wegner et al.

(10) Patent No.: US 7,562,664 B2
(45) Date of Patent: *Jul. 21, 2009

(54) APPARATUS, PRODUCTS AND PROCESSES FOR PREVENTING THE OCCURRENCE OF RUST STAINS RESULTING FROM IRRIGATION SYSTEMS USING WATER CONTAINING IRON IONS

(76) Inventors: Paul Wegner, 1340 Eaton Ave., San Carlos, CA (US) 94070; Frank J. Benasutti, 17294 Bermuda Village Dr., Boca Raton, FL (US) 33487

( * ) Notice: Subject to any disclaimer, the term of this patent is extended or adjusted under 35 U.S.C. 154(b) by 0 days.

This patent is subject to a terminal disclaimer.

(21) Appl. No.: 12/213,717

(22) Filed: Jun. 23, 2008

(65) Prior Publication Data

US 2008/0272037 A1    Nov. 6, 2008

Related U.S. Application Data

(63) Continuation-in-part of application No. 11/799,541, filed on May 1, 2007, now Pat. No. 7,399,366.

(51) Int. Cl.
*B08B 3/04* (2006.01)
*B08B 3/00* (2006.01)

(52) U.S. Cl. .................. 134/104.1; 2/10; 2/26; 2/27; 2/29; 2/36; 42/93; 42/95.3; 42/99.2; 42/104.3; 42/198

(58) Field of Classification Search .......... None
See application file for complete search history.

(56) References Cited

U.S. PATENT DOCUMENTS

| | | | | |
|---|---|---|---|---|
| 2,360,509 A * | 10/1944 | Morgan et al. | ............ | 148/246 |
| 2,585,616 A * | 2/1952 | Barnes | ............ | 134/3 |
| 2,694,657 A * | 11/1954 | Brundin | ............ | 134/13 |
| 2,856,278 A * | 10/1958 | Bray et al. | ............ | 71/25 |
| 3,804,757 A * | 4/1974 | Ruschenburg | ............ | 210/750 |
| 4,578,243 A * | 3/1986 | Quinlan | ............ | 422/7 |
| 4,828,743 A * | 5/1989 | Rahfield et al. | ............ | 510/363 |
| 5,215,676 A * | 6/1993 | Stone | ............ | 510/363 |
| 5,250,502 A * | 10/1993 | Grasso | ............ | 504/277 |
| 5,685,993 A * | 11/1997 | Liu | ............ | 210/695 |
| 5,700,377 A * | 12/1997 | Cox | ............ | 210/724 |
| 6,361,613 B2 * | 3/2002 | Lee | ............ | 134/3 |
| 6,524,397 B2 * | 2/2003 | Sakurai et al. | ............ | 134/29 |
| 6,528,468 B2 * | 3/2003 | Matsukawa et al. | ............ | 510/258 |
| 6,841,572 B2 * | 1/2005 | Horst et al. | ............ | 514/557 |
| 7,163,915 B2 * | 1/2007 | Gernon et al. | ............ | 510/245 |
| 2007/0023359 A1 * | 2/2007 | Grott | ............ | 210/670 |

* cited by examiner

*Primary Examiner*—Michael Barr
*Assistant Examiner*—Rita R Patel
(74) *Attorney, Agent, or Firm*—Frank J. Benasutti

(57) ABSTRACT

Several products and processes for preventing the occurrence of rust stains resulting from irrigation systems using water having iron ions, such as well water, and for cleaning off rust stains resulting from the use of said irrigation systems are disclosed. In one embodiment, ammonium sulfate is mixed with well water and then this mixture is mixed with incoming well water being sprayed on the surfaces. In another embodiment, ammonium bisulfate is used for the removal of rust stains. Then ammonium sulfate is mixed with the incoming well water being sprayed in the next cycle, to prevent rust formation.

2 Claims, 2 Drawing Sheets

APPARATUS, PRODUCTS AND PROCESSES FOR PREVENTING THE OCCURRENCE OF RUST STAINS RESULTING FROM IRRIGATION SYSTEMS USING WATER CONTAINING IRON IONS

CROSS-REFERENCE TO RELATED APPLICATION

This application is a continuation-in-part of our prior co-pending application Ser. No. 11/799,541 filed May 1, 2007 now U.S. Pat. No. 7,399,366 entitled "Products and processes for preventing the occurrence of rust stains resulting from irrigation systems using water containing iron ions and for cleaning off rust stains resulting from using said irrigation systems", the disclosure of which is incorporated herein by reference as if fully set forth.

BACKGROUND OF THE INVENTION

1. Technical Field

This invention relates to treating clean surfaces with well water containing an agent to inhibit the formation of rust and to cleaning off rust stains from surfaces that have been treated with water containing iron ions, such as the porous surfaces of plants and concrete which have been sprayed with water drawn from a well.

2. Description of the Prior Art

In the prior art it was known to clean off rust stains from the porous surfaces of plants and concrete that have been treated with water containing iron ions, such as surfaces which have been sprayed with water drawn from a well. The most common cleaners contain oxalic acid. This acid containing product is applied after the spraying has ceased. Once applied, this acid had to be treated with water the remove it; after it had cleaned off the rust.

Rust inhibitors containing other substances were then mixed with the incoming well water being sprayed in the next cycle, to prevent further rust formulation.

We have found that current products are not effective over the long run in preventing rust stain reoccurrence.

SUMMARY OF INVENTION

Our invention comprises an apparatus and several products and processes for preventing the occurrence of rust stains resulting from well water irrigation systems and for cleaning off rust stains resulting from well water irrigation systems.

In one embodiment, we mix ammonium sulfate with well water to form a solution. Then we mix this resulting solution with incoming well water and then treat the surfaces with this mixture of well water to prevent rust formation.

In another embodiment, we mix ammonium bisulfate with water and treat surfaces containing rust stains with this dilute ammonium bisulfate for removal of rust stains. Then we mix ammonium sulfate with the incoming well water being sprayed in the next cycle, to prevent rust formation.

DESCRIPTION OF THE PREFERRED EMBODIMENTS

In the preferred embodiment, mix ammonium sulfate with well water to form a solution. Then add this resulting solution to the well water being sprayed out in an irrigation system to prevent rust formation on the porous surfaces of plants and concrete being sprayed. This solution can be prepared using one teaspoon of ammonium sulfate to one gallon of water.

Note that if the water is neutral and has low dissolved solids in it, it would take very little ammonium sulfate to make the water slightly acidic and prevent rust formation.

In another embodiment, mix ammonium bisulfate with water to form a dilute solution. Then treat surfaces containing rust stains with this dilute solution of ammonium bisulfate for removal of rust stains. Then, preferably, rinse the surface with clean water that does not come from the well.

Thereafter, mix a solution of ammonium sulfate with the incoming well water being sprayed in the next cycle (as described above in connection with the preferred embodiment), on the surfaces that had been treated and thus prevent rust formation.

One method of making ammonium bisulfate is to mix 1.5 gal of battery acid (H2SO4) with 7.5 pounds of ammonium sulfate. The resulting solution can then be diluted with an equal amount of water.

This may then be diluted by half again with water.

Apply this resulting solution to stained areas to remove the rust stains.

In alternate embodiments, this solution may be further diluted with water and then applied to stained areas until the diluted solution is no longer effective in removing rust stains. By this trial and error method, the most cost effective rust removal solution may be determined.

Once the rust has been removed, and before the surfaces are dry, treat the surfaces again with an ammonium sulfate solution (as described above in connection with the preferred embodiment) prevent rust formation.

One way to effect this second treatment is to add this second solution to the last ten percent of the initial spraying cycle in an irrigation system spraying well water. This may be accomplished by providing a duplicate parallel timer controlled well pump activation system; set to recycle the irrigation at ten percent of the times used in the irrigation cycle. This duplicate system should include a container for the solution to be added and a means of withdrawing the solution and introducing it into well water being sprayed.

Testing in the actual environment should be done to show the frequency of application needed to prevent rust re-occurrence.

Figure 1:
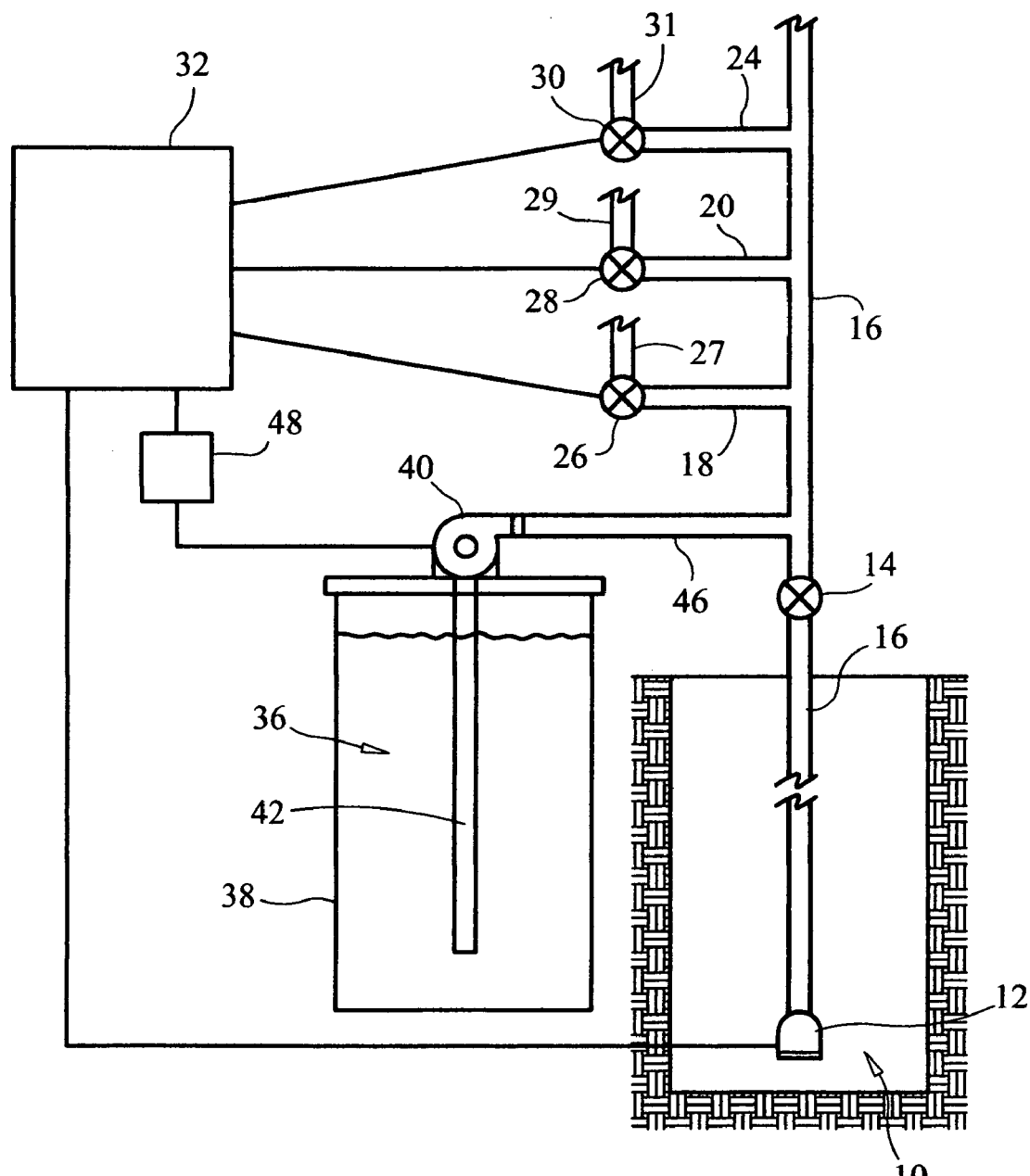
FIG. 1 is a schematic drawing of an apparatus in accordance with our invention.
Figure 2:
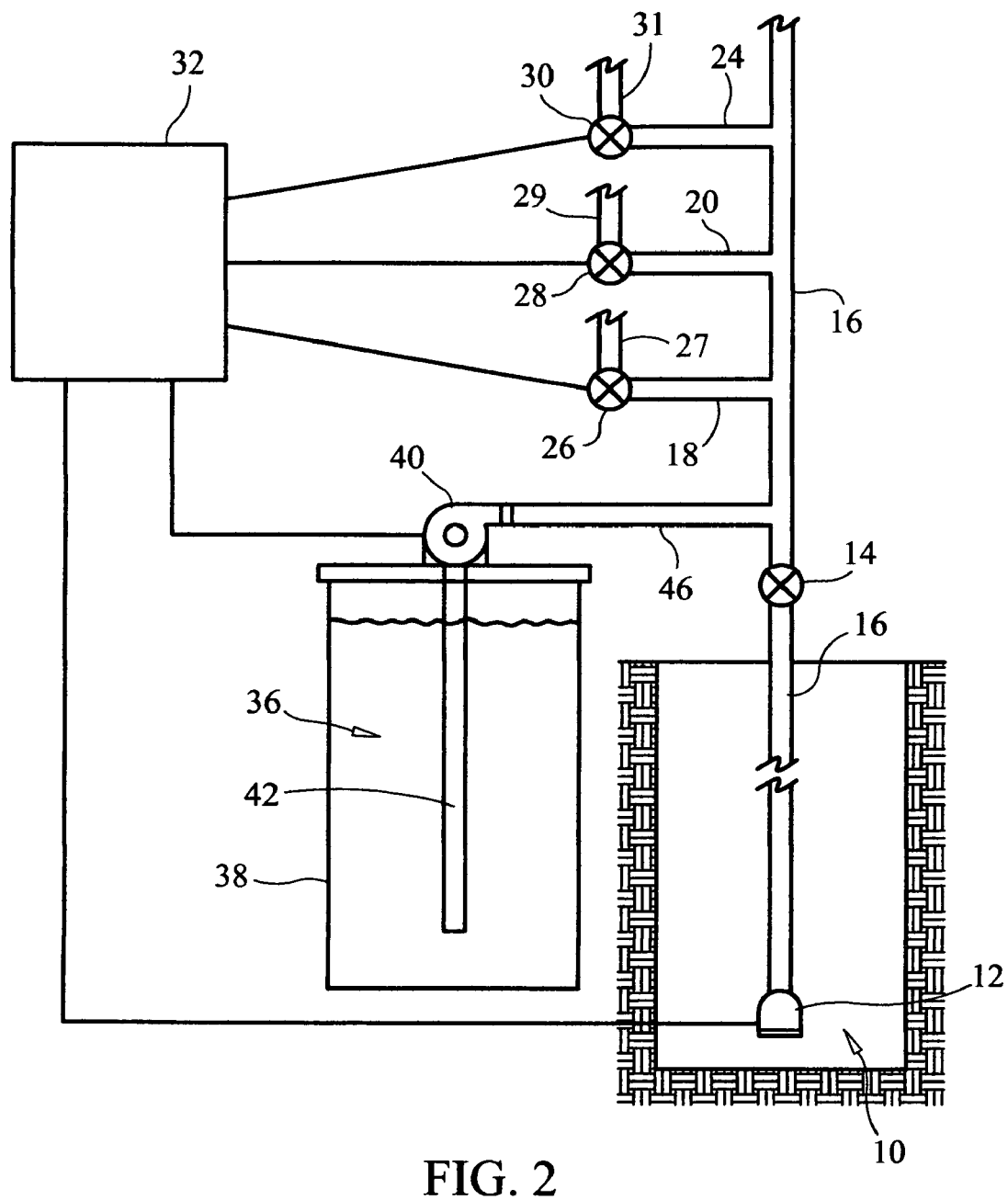
FIG. 2 is a schematic drawing of another apparatus.

Referring to the FIG. 1, an apparatus is shown in accordance with a preferred embodiment our invention. This apparatus is useful for distributing well water with rust inhibiting additives in it to multiple sprinkler system zones.

FIG. 1 shows a well designated generally 10 with a pump 12. The pump 12 pumps water from the well, up through a conduit 16 to a valve 14, which controls the flow of water from the well. The discharge of the valve 14 is connected to a conduit manifold 16. When the valve 14 is open and the pump 12 is running, the conduit manifold 16 supplies water to a series of sprinkler heads in the lines 27, 29 and 31 (not shown, but conventionally known) which are segregated into zones. Each zone is controlled by a electrically controlled valve 26, 28 and 30. For example, each valve is connected by a short conduit 18, 20 and 24 to the manifold 16; which are connected to valves 26, 28 and 30 respectively. A zone timer 32 controls the activation of the pump 12, and also the opening of the valves 26, 28 and 30. The timer sequentially opens the valve for each zone for a predetermined time. That is, once a zone has run, for example, for 20 minutes the valve controlling that zone is closed and the next valve is opened for the time of 20 minutes (or whatever time is desired for the next zone).

A storage tank 38 is provided containing a solution of rust inhibitor 36, for the introduction of a rust inhibitor into the system. A pump 40 is mounted on top of the storage tank 38 and has an input conduit 42 positioned to withdraw rust inhibitor solution from the tank at a point near the bottom of the tank. The discharge from the pump 40 flows through a conduit 46 which is connected downstream of the valve 14 to the manifold 16 for introducing small amounts of rust inhibitor into the sprinkler system. The activation of the pump 40 is controlled by an internal relay in the zone timer 32 and by an external relay 48. By this means metered amounts of rust inhibitor may be introduced into the system at whatever time the user wishes to select through the timer 32.

To use this apparatus to prevent rust from forming, first clean off the rust with a rust removal solution. Next, rinse immediately.

Next, to add rust inhibitor to the input of the sprinkler system, add it to the tank and then fill the rest of the tank with water.

Use a dosing pump 40 to pump a small amount of the contents of the tank into the input line of the sprinkler system. The amount added may have to be adjusted depending on the flow rate of the main system well pump 12, the flow rate of the dosing pump 40 and the iron content of the water. If the amount being added is correct, rust should no longer appear. If rust appears over time, increase the concentration of the rust inhibitor in the tank, by putting more of it in the tank before filling the tank with water.

In using our rust inhibitor, ammonium sulfate, we theorize that about one teaspoon per gallon of water at the end of each irrigation cycle would effectively prevent the re-occurrence of rust. That is about 1,000 ppm; which is less than ½ the potable water limit. However, that would be obtained if you were to pour the inhibitor onto the site being struck with the water.

In the irrigation system we have described we theorize that the addition of ten pounds of ammonium sulfate to a five gallon pail of water would provide an adequate addition to a 55 gallon tank.

We believe that it is only necessary to treat the water in the last few minutes of a cycle to obtain the desired rust inhibition. Thus in a 20 minute watering cycle, it may be necessary to add the inhibitor for only the last 4 minutes. This will result in a great savings of rust inhibitor product; since the rust inhibitor product will not be used up continuously throughout the cycle.

If it is desired to run the pump 40 at a time interval less than the full amount of time that each zone is being operated, then the zone timer, must be set to have its internal time delay mechanism or relay mechanism to stop the flow of water into the system intermittently and thus the introduction of rust inhibitor from the pump 40; by turning that pump off intermittently.

For example, if the zone timer 32 is set to supply each zone with well water for 20 minutes, sequentially, then the internal timer would be set so that the first relay would not turn on the rust inhibitor pump 40 for a period of time, say 16 minutes and then would turn the rust inhibitor pump on for the remaining four minutes of that cycle. To do this effectively, the zone timer would delay before turning on the next zone valve for a period of say, two seconds. During that period of two seconds there would be no electricity sent to the rust inhibitor pump 40. Then, when the next cycle starts for the next zone, that zone would run for 16 minutes before activating the rust inhibitor pump 40 for the last four minutes.

In all events, be sure to check on the water level in the tank so that it never runs out. If you allow the water in the tank to run out, the new water from the well will not be treated and the rust will come back.

In many of these systems, it is necessary to run what is known as a "wet" check. In that event the system is turned on briefly for each zone to check to see which sprinkler heads are malfunctioning and have to be replaced. If you were to run a "wet" check, it would be necessary to run the dosing pump continuously. To do this is desirable to have another zone timer, like the timer 37, connected to the system and the dosing pump, so that the dosing pump feeds rust inhibitor continuously for the brief time interval when the "wet" check is being conducted. Such a system is shown in FIG. 2. Otherwise, the well water will not be treated and the rust will come back. In this alternate system, the relay 48 has been deleted.

Form what we have disclosed, we have invented a product for use with an irrigation system to prevent the occurrence of rust stains on porous surfaces, which stains could result from water which contains iron ions being sprayed on the porous surfaces by said irrigation system, said product comprising a mixture of ammonium sulfate and water.

We have also invented a product for cleaning off rust stains from porous surfaces, which stains resulted from water irrigation systems, comprising a mixture of ammonium bisulfate and water.

We have invented an apparatus for use with an irrigation system to prevent the occurrence of rust stains on porous surfaces, which stains could result from water which contains iron ions being sprayed on the porous surfaces by said irrigation system, said apparatus comprising a means for treating the water coming into the irrigation system with a product useful in preventing the formation of rust stains, for a period of time which is less than the period of time that the irrigation system is spraying water. This apparatus also can be applied in an irrigation system that has a plurality of irrigation zones and the product useful in preventing the formation of rust stains may be introduced in each zone for a period of time which is less than the period of time that the irrigation system is spraying water in that zone.

The invention claimed is:

1. An apparatus for use with an irrigation system to prevent the occurrence of rust stains on porous surfaces, which stains could result from water which contains iron ions being sprayed on the porous surfaces by said irrigation system, said apparatus comprising a means for treating the water coming into the irrigation system with said tank containing a product and product useful in preventing the formation of rust stains, for a period of time which is less than the period of time that the irrigation system is spraying water, said product comprising a mixture of ammonium bisulfate and water.

2. The apparatus of claim 1 wherein the irrigation system has a plurality of irrigation zones and the product useful in preventing the formation of rust stains is introduced in each zone for a period of time which is less than the period of time that the irrigation system is spraying water in that zone.

* * * * *

UNITED STATES PATENT AND TRADEMARK OFFICE
CERTIFICATE OF CORRECTION

| | | |
|---|---|---|
| PATENT NO. | : 7,562,664 B2 | |
| APPLICATION NO. | : 12/213717 | |
| DATED | : July 21, 2009 | |
| INVENTOR(S) | : Paul Wegner and Frank J. Benasutti | |

It is certified that error appears in the above-identified patent and that said Letters Patent is hereby corrected as shown below:

In the Claims, delete Claim 4 and insert amended Claim 4 as follows:

--An apparatus for use with an irrigation system to prevent the occurrence of rust stains on porous surfaces, which stains could result from water which contains iron ions being sprayed on the porous surfaces by said irrigation system, said apparatus comprising a tank containing a product and means for treating the water coming into the irrigation system with said product useful in preventing the formation of rust stains, for a period of time which is less than the period of time that the irrigation system is spraying water said product comprising a mixture of ammonium sulfate and water.--

Signed and Sealed this

Fifteenth Day of September, 2009

David J. Kappos
*Director of the United States Patent and Trademark Office*

UNITED STATES PATENT AND TRADEMARK OFFICE
CERTIFICATE OF CORRECTION

PATENT NO. : 7,562,664 B2  Page 1 of 1
APPLICATION NO. : 12/213717
DATED : July 21, 2009
INVENTOR(S) : Paul Wegner and Frank J. Benasutti It is certified that error appears in the above-identified patent and that said Letters Patent is hereby corrected as shown below:

Column 4, lines 46-55,

In the Claims, delete Claim 1 and insert amended Claim 1 as follows:

--An apparatus for use with an irrigation system to prevent the occurrence of rust stains on porous surfaces, which stains could result from water which contains iron ions being sprayed on the porous surfaces by said irrigation system, said apparatus comprising a tank containing a product and means for treating the water coming into the irrigation system with said product useful in preventing the formation of rust stains, for a period of time which is less than the period of time that the irrigation system is spraying water said product comprising a mixture of ammonium sulfate and water.--

This certificate supersedes the Certificate of Correction issued September 15, 2009.

Signed and Sealed this

Sixth Day of October, 2009

David J. Kappos
*Director of the United States Patent and Trademark Office*